UNITED STATES PATENT OFFICE.

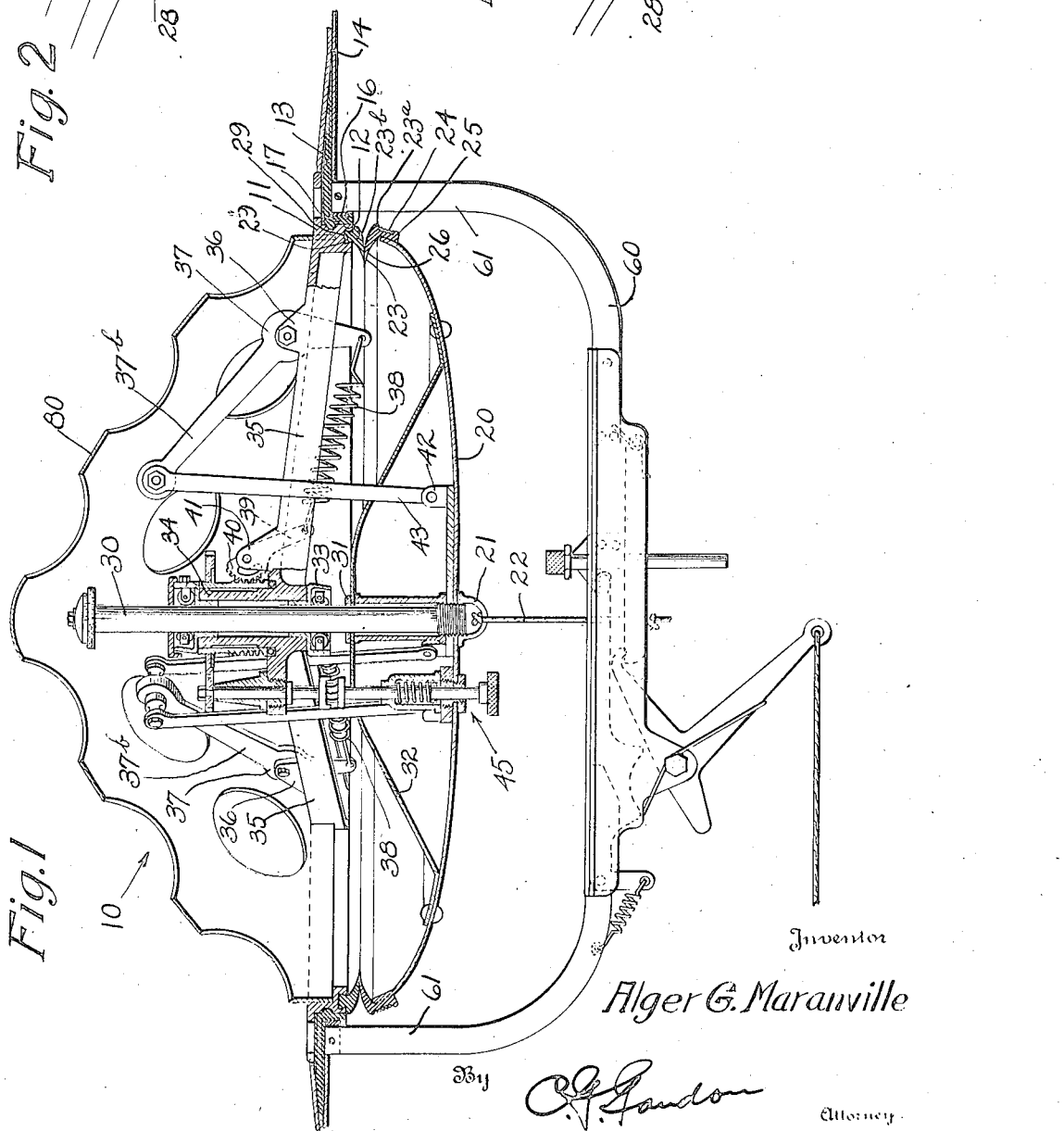

ALGER G. MARANVILLE, OF AKRON, OHIO, ASSIGNOR TO THE GOODYEAR TIRE & RUBBER COMPANY, OF AKRON, OHIO, A CORPORATION OF OHIO.

VALVE.

1,426,894.  Specification of Letters Patent.  Patented Aug. 22, 1922.

Application filed October 16, 1919. Serial No. 331,199.

*To all whom it may concern:*

Be it known that I, ALGER G. MARANVILLE, a citizen of the United States, and resident of Akron, Ohio, have invented new and useful Improvements in Valves, of which the following is a specification.

My invention relates to a gas valve, and has particular reference to a double lip gasket the two lips or parts of which function as valve and valve seat respectively of an automatic relief valve especially adapted for use on balloons, air ballonnets, and the like.

It is an object of my invention to provide valve members which will be so sensitive as to open and close immediately on slight fluctuations or variations of pressure difference, and yet when closed will be so tight that there will be practically no gas leakage.

It is a further object of my invention to provide a flexible gasket, preferably of rubber, comprising two sections in the form of lips, which delicately cooperate, and will not induce the collection of condensed moisture on the surfaces thereof and hence will be free from any tendency to stick or to freeze together when the temperature is at or near the freezing point of water, a disadvantage frequently encountered where a valve or seat of metal is in use.

Other objects and advantages will appear as the description proceeds, and the invention will be more particularly defined in the claims hereto appended.

In the drawings, wherein I have illustrated a preferred form of my invention used in connection with an automatic valve for balloons, or ballonnets:

Figure 1 is a vertical section of an automatic gas valve showing the gasket of my invention in place;

Figure 2 is an enlarged section of a portion of the gasket; and

Figure 3 is an enlarged section of a portion of a gasket of modified construction.

Referring to Figure 1, the numeral 10 designates, as a whole, an automatic valve such as used on balloons or air ballonnets, or the like, for maintaining an equilibrium of pressure difference by compensating for any variations in atmospheric pressure, such variations being caused by change in altitude, temperature, and certain other atmospheric conditions.

This valve 10 comprises a metal annulus 11 nicely fitted into a circular opening 12 formed by a ring shaped gasket 13 preferably of rubber impregnated fabric, the gasket being secured to said annulus 11 and within a circular aperture in the balloon envelope 14 by a split band, forming a clamping ring 16 which encircles an upstanding flange 17 on the gasket 13 and binds the gasket to the annulus 11, the edge of the balloon fabric 14 being secured to the gasket 13 by cementing or otherwise. This gasket 13 is especially adapted for setting a gas valve like 10 in a gas or air envelope so that not only is a tight joint secured, but the valve may be readily and quickly inserted in place and removed, as is more fully described and set forth in my copending application Ser. No. 331,198 of even date, of which it forms the subject matter.

The valve 10 comprises the dome or disk 20 referred to, which is concavo-convex in form and is provided at its center with a lug 21 or the like, to which a cord or cable 22 may be fastened by making a knot in the end thereof, as shown, the cable being part of the manual operating mechanism.

To the outer edge of the dome 20 is secured one section 23$^a$ of the gasket 23, which gasket forms the subject matter of my present invention. The gasket section 23$^a$ may be secured to the dome 20 by means of cord or wire 24 tightly wound about the gasket, a bead 25 on the gasket preventing the windings from slipping off. This gasket section 23$^a$, preferably of soft vulcanized rubber or other flexible material, is, in cross-section, somewhat inverted L-shaped, the base in this modification being shown as slightly curved having an inwardly turned lip 26 so bevelled or tapered as to present a thin sharp edge 27, best seen in Fig. 2. Cooperating with the part or section 23$^a$ of the gasket is a second part or section 23$^b$, also preferably of soft rubber, somewhat anvil-shaped in cross-section, which has a similar surface and a lip portion adapted to contact with the part 23$^a$ and which is formed with a similar inwardly turned lip 28 also beveled to a sharp edge. The gasket section 23$^b$ is secured to the annulus 11, preferably by being provided with a rib 29, wedge or keystone shaped in cross-section, which fits into a similarly shaped groove on the annulus 11.

Normally the valve 10 is automatically operated by difference in pressure between that inside the envelope and that of the atmosphere to hold the outer edges of the gasket 23 apart, with the lip portions 26 and 28 only in contact and to open the valve for the relief of pressure inside the envelope, the lips separating immediately when the predetermined pressure difference is attained. The mechanism for effecting this operation consists of the dome 20 exposed to atmospheric pressure on one side, and to that inside the envelope on the other. This dome has secured to the central portion thereof, and opposite the lug 21, a stem 30 which is supported or reinforced by any suitable means such as a collar 31 carried by a concaved plate or disc 32 secured to the dome, which gives the device greater rigidity. The stem 30 passes through a central frictionless bearing 33 supported by a hub 34 formed at the meeting point of three spider arms 35 which are radially arranged and fixed to the inner surface of the annulus 11, and project inwardly to the center. A pair of ears 36 is formed integral with each spider arm 35, near the outer end thereof, and between the ears of each pair is pivoted a bell-crank lever 37. Helical contractile springs 38 are secured at one end to the shorter ends 37$^a$ of the bell-crank 37, and the other ends of the springs 38 are fastened to arms 39 of toothed sectors 40 pivoted between ears 41 carried by the spider arms 35 at their inner ends and near the hub 34. The long end 37$^b$ of each bell-crank 37 is connected to lugs 42 projecting inwardly from the dome 20, and near the center thereof, by means of links 43. It will thus be seen that the springs 38 tend to move the valve toward closed position by pulling the dome 20 toward the envelope, bringing the lips 26 and 28 of the gasket sections 23$^a$ and 23$^b$ into contact to shut off the outflow of gas.

I have also provided mechanism for suitably adjusting the tension of the springs 38, but this mechanism which is designated as a whole by the reference numeral 45, constitutes no part of my present invention, but is more fully described and explained in my copending application, Ser. No. 331,197 of even date.

In addition to the mechanism for automatically operating the valve, I have provided a manually operated means. A frame or yoke 60 is secured to the ring 16 by means of bifurcations or legs 61 which give the frame greater rigidity, and spans the circle formed by the dome 20. This frame carries the mechanism for manually operating the valve 10, which mechanism, however, constitutes no part of my present invention, but is more fully explained and described in my copending application Ser. No. 331,200 of even date.

A guard 80 consisting of a conoidal casing, perforated to reduce weight, has been provided to protect the valve mechanism 10, and is secured to the annulus 11 by means of screws, so as to enclose the valve 10.

In Fig. 3 I have shown a modified form of gasket 23 which is similar to that shown in in Fig. 2. In the face of the gasket of Fig. 3, however, the element 23$^a$ is provided with a recess or channel 23', annular in extent and producing a heel portion 23'', the lip portion lying slightly outside the plane of the heel portion 23'' toward the cooperating lip 28 of the section 23$^b$, which is molded in similar form to 23$^a$. The heel portion 23'' serves to prevent the outer edges of the gasket being held together and allows the lips to separate instantly when the predetermined pressure difference is reached.

From the foregoing it is believed that the operation and function of the gasket will be understood. They will, however, be briefly repeated.

The springs 38 are adjusted to the desired tension, so that normally the outer edges of the gasket portions 23$^a$ and 23$^b$ are separated and the lip portions 26 and 28 are alone in contact until the predetermined degree of pressure difference is exceeded, due to a decrease in atmospheric pressure for example, when the lips will separate, and the valve will open quickly to substantially its maximum opening to reestablish equilibrium of pressure difference. When such equilibrium has been restored the valve will close quickly until the lips alone are again in contact again. It is to be noted that normally there is substantially no movement of the valve prior to the actual separation of the lips should the atmospheric pressure exceed the gas pressure within the envelope. These lips are alone in contact, yet owing to their shape and flexibility and to the fact that they are pressed together by the gas pressure within the envelope, they produce a substantially leakless seal.

Since there is no metallic part forming either the valve seat or valve, the tendency for moisture to condense on the contacting surfaces, especially in cold weather, is eliminated, thus preventing sticking or freezing. The valve parts or gasket sections are also readily manufactured by curing the same in molds, and are easily replaceable if they should become damaged or worn.

While my invention relates to the gasket 23 composed of the sections 23$^a$ and 23$^b$, I have considered it advisable in the interests of clearness, and in order that its delicate action may be more clearly seen and its other advantages appreciated, to illustrate the gasket in relation to its associated elements, and although I have disclosed but two embodiments of the invention it will be understood that changes and modifications may be made such as fall within the scope of the appended claims without in any manner departing from the essence of the invention.

What I claim is:

1. In a valve of the character described, the combination with a gas receptacle having an outlet, of an automatic valve in said outlet, comprising a flexible resilient gasket having two lipped sections, said lips serving as valve and valve seat respectively, pressed together by the gas pressure within said receptacle when the valve is closed and adapted to be separated by the variations in pressure difference between that of the atmosphere and that inside the receptacle.

2. In a valve of the character described, the combination with a gas receptacle having an outlet, of an automatic valve in said outlet, comprising a non-metallic gasket having two lipped sections, said lips serving as valve and valve seat respectively, pressed together by the gas pressure within said receptacle, when the valve is closed, and adapted to be separated by the variations in pressure difference between that of the atmosphere and that inside the receptacle.

3. In a valve of the character described, the combination with a gas receptacle having an outlet, of an automatic valve in said outlet, comprising a flexible resilient gasket having two lips, said lips serving as valve and valve seat respectively, pressed together by the gas pressure within said receptacle when the valve is closed and adapted to be separated by the variations in pressure difference between that of the atmosphere and that inside the receptacle.

4. In a valve of the character described, the combination with a gas receptacle having an outlet, of an automatic valve in said outlet, comprising a flexible resilient gasket having two soft rubber lips, said lips serving as valve and valve seat respectively, pressed together by the gas pressure within said receptacle when the valve is closed, and adapted to be separated by the variations in pressure difference between that of the atmosphere and that inside the receptacle.

5. In a valve of the character described, the combination with a gas receptacle having an opening, an annulus fitted into and secured within said opening, a flexible resilient gasket section having a lip and secured to said annulus, a relatively movable valve member, a second flexible resilient gasket section having a lip and secured to said valve member, the lips only of said gasket sections cooperating with each other as valve and valve seat, and means for normally holding said lips only in contact with each other.

6. In a valve of the character described, the combination with a gas receptacle having an opening, an annulus fitted into and secured within said opening, a non-metallic gasket section having a lip and secured to said annulus, a relatively movable valve member, a second non-metallic gasket section having a lip and secured to said valve member, the lips of said gasket sections cooperating with each other as valve and valve seat, and means for normally holding said lips only in contact with each other.

7. In a valve of the character described, the combination with a gas receptacle having an opening, an annulus fitted in and secured within said opening, said annulus having a groove wedge-shaped in cross-section, a non-metallic gasket section provided with a lip and having a wedge-shaped rib fitted into said groove of said annulus, a relatively movable valve member, a second non-metallic gasket section having a lip and secured to said valve member, the lips of said gasket sections cooperating with each other, and means for normally holding said lips only in contact with each other.

8. In a valve of the character described, the combination with a gas receptacle having an opening, an annulus fitted into and secured within said opening, a non-metallic gasket section having a lip and secured to said annulus, a relatively movable valve member, a second non-metallic gasket section, angle-shaped in cross-section, one leg of the angle being bound to the outside of said valve member, and the other forming a lip, the lips of said gasket sections cooperating with each other, and means for normally holding said lips only in contact with each other.

9. In a valve of the character described, the combination with a gas receptacle having an opening, an annulus fitted into and secured within said opening, said annulus having a groove wedge-shaped in cross-section, a non-metallic gasket section provided with a lip having a wedge-shaped rib fitted into said groove of said annulus, a relatively movable valve member, a second non-metallic gasket section, angle-shaped in cross-section, one leg of said angle being bound to the outside of said valve member, and the other leg of said angle forming a lip, the lips of said gasket sections cooperating with each other, and means for normally holding said lips only in contact with each other.

10. In a valve of the character described, the combination with a gas receptacle having an opening, an annulus fitted in and secured within said opening, said annulus having a groove wedge-shaped in cross-section, a flexible resilient gasket section provided with a lip and having a wedge-shaped rib fitted into said groove of said annulus, a relatively movable valve member, a second flexible resilient gasket section having a lip and secured to said valve member, the lips of said gasket sections cooperating with each other, and means for normally holding said lips only in contact with each other.

11. In a valve of the character described, the combination with a gas receptacle having an opening, an annulus fitted into and secured within said opening, a flexible resilient gasket section having a lip and secured to said annulus, a relatively movable valve member, a second flexible resilient gasket section, angle-shaped in cross-section, one leg of said angle being bound to the outside of said valve member, the other leg forming a lip, the lips of said gasket sections cooperating with each other, and means for normally holding said lips only in contact with each other.

12. In a valve of the character described, the combination with a gas receptacle having an opening, an annulus fitted into and secured within said opening, said annulus having a groove wedge-shaped in cross-section, a flexible resilient gasket section provided with a lip and having a wedge-shaped rib fitted into said groove of said annulus, a relatively movable valve member, a second flexible resilient gasket section, angle-shaped in cross-section, one leg of said angle being bound to the outside of said valve member, the other leg forming a lip, the lips of said gasket sections cooperating with each other, and means for normally holding said lips only in contact with each other.

13. In a device of the character described in combination, a gas receptacle having an outlet opening, a valve in said opening comprising two annular non-metallic gasket sections, each having inwardly turned flexible resilient lips, and means for normally holding said lips in contact with each other.

14. In a device of the character described in combination, a gas receptacle having an outlet opening, a valve in said opening comprising two annular non-metallic gasket sections, each having a recess on its work face to form a heel and an inwardly turned flexible lip, and means for normally holding said lips in contact with each other, said heels being separated.

15. A gasket comprising two sections of flexible resilient material and having cooperating surfaces, each section being provided with a bead portion at its outer edge.

16. In an apparatus of the character described, fluid-controlling elements comprising a thin lipped resilient valve seat, an automatically operated valve element, said element having a thin resilient lip cooperating with said valve seat, means for holding said lip edges alone in contact during normal operation, until a predetermined pressure difference is attained, when said lips separate.

17. A gasket comprising two sections adapted to be opposed in co-engaging relation, each section having a body portion provided with a lip member disposed in angular relation thereto, and a bead portion at the outer edge of said body portion.

18. A gasket comprising two sections adapted to be opposed in co-engaging relation, each section having a body portion, said body portions being provided respectively with a plane surface, a lip member for each body portion disposed in angular relation with respect thereto, and a bead at the outer edge of each body portion.

19. A gasket comprising two sections adapted to be opposed in co-engaging relation and comprising each, a body portion having a plane surface, a flexible lip member for each body portion disposed at an angle with respect thereto, and a bead at the outer edge of each body portion, said lip normally lying at an angle to said plane surface.

20. A gasket comprising two sections adapted to be opposed in co-engaging relation and comprising respectively, a body portion and a flexible lip member disposed in relative angular relation with respect thereto, one of said body portions being of dove-tail shape in cross-section.

21. A gasket comprising two sections adapted to be opposed in co-engaging relation and comprising respectively, a body portion and a flexible lip member disposed in relative angular relation with respect thereto, said body portions being respectively of dove-tail and of L-shape contour in cross-section.

22. A gasket comprising two sections adapted to be opposed in co-engaging relation and comprising respectively, a body portion and a flexible lip member disposed in angular relation with respect thereto, one of said body portions being of dove-tail shape in cross-section, and a bead at the outer opposing edges of said body portion.

In witness whereof, I have hereunto signed my name in the presence of two subscribing witnesses.

ALGER G. MARANVILLE.

Witnesses:
J. E. KEATING,
PHILIP E. BARNES.